(12) United States Patent
Crowe

(10) Patent No.: US 10,486,835 B2
(45) Date of Patent: Nov. 26, 2019

(54) CENTRIFUGAL FORCE AMPLIFICATION METHOD AND SYSTEM FOR GENERATING VEHICLE LIFT

(71) Applicant: William R. Crowe, Port Haywood, VA (US)

(72) Inventor: William R. Crowe, Port Haywood, VA (US)

( * ) Notice: Subject to any disclaimer, the term of this patent is extended or adjusted under 35 U.S.C. 154(b) by 383 days.

(21) Appl. No.: 15/351,187

(22) Filed: Nov. 14, 2016

(65) Prior Publication Data

US 2017/0050752 A1 Feb. 23, 2017

Related U.S. Application Data

(63) Continuation-in-part of application No. 13/975,420, filed on Aug. 26, 2013, now abandoned.

(60) Provisional application No. 61/776,916, filed on Mar. 12, 2013.

(51) Int. Cl.
| | |
|---|---|
| *B64G 1/40* | (2006.01) |
| *B64C 39/12* | (2006.01) |
| *B64C 19/00* | (2006.01) |
| *B64C 39/10* | (2006.01) |

(52) U.S. Cl.
CPC .............. *B64G 1/409* (2013.01); *B64C 19/00* (2013.01); *B64C 39/10* (2013.01); *B64C 39/12* (2013.01)

(58) Field of Classification Search
CPC ..... B64C 39/001; B64C 39/06; B64C 39/062; B64G 1/409

USPC ................ 244/171.5, 23 R, 23 A, 23 C, 12.2
See application file for complete search history.

(56) References Cited

U.S. PATENT DOCUMENTS

| | | | | | |
|---|---|---|---|---|---|
| 1,907,815 | A | * | 5/1933 | Hough | A63H 27/14 446/41 |
| 2,009,780 | A | * | 7/1935 | Laskowitz | B06B 1/10 74/84 S |
| 2,441,157 | A | * | 5/1948 | Kissel | G01C 19/26 74/5.1 |
| 2,922,277 | A | * | 1/1960 | Bertin | B64C 11/001 244/12.2 |
| 2,939,648 | A | * | 6/1960 | Fleissner | B64C 39/001 244/12.2 |
| 2,953,320 | A | * | 9/1960 | Parry | B64C 27/20 244/12.2 |
| 3,020,003 | A | * | 2/1962 | Frost | B64C 39/001 244/15 |
| 3,266,325 | A | * | 8/1966 | Schaffer | G01C 21/18 74/5.34 |
| 3,437,290 | A | * | 4/1969 | Norman | B64C 27/20 244/12.2 |
| 3,503,573 | A | * | 3/1970 | Modesti | B64C 39/001 244/12.2 |
| 3,605,328 | A | * | 9/1971 | Kilroy, Jr. | A63H 27/14 446/41 |

(Continued)

*Primary Examiner* — Medhat Badawi
(74) *Attorney, Agent, or Firm* — Robert E. Bushnell, Esq.

(57) ABSTRACT

A method and system generate lift for a vehicle relative to a planetary body rotating at a rotational speed. The vehicle incorporates two concentric lift rings in a common plane. The lift rings are positioned such that their common plane is approximately perpendicular to a force of gravity on the planetary body. The hit rings are rotated in opposing directions at speeds that are at least 20 times greater than the rotational speed of the planetary body.

14 Claims, 11 Drawing Sheets

(56) References Cited

U.S. PATENT DOCUMENTS

| | | | | |
|---|---|---|---|---|
| 3,653,269 A | * | 4/1972 | Foster | F03G 3/08 74/84 S |
| 3,750,484 A | * | 8/1973 | Benjamin | F03G 3/00 74/84 S |
| 3,838,835 A | * | 10/1974 | Kling | B64C 27/20 244/23 C |
| 4,193,568 A | * | 3/1980 | Heuvel | B64C 39/001 244/23 C |
| 4,238,968 A | * | 12/1980 | Cook | F03G 3/00 74/84 R |
| 4,456,265 A | * | 6/1984 | Adler | B64C 39/06 473/589 |
| 5,039,031 A | * | 8/1991 | Valverde | B64C 39/001 244/12.2 |
| 5,064,143 A | * | 11/1991 | Bucher | B64C 27/10 244/12.2 |
| 5,836,543 A | * | 11/1998 | Kunkel | F02K 9/68 244/12.2 |
| 5,839,690 A | * | 11/1998 | Blanchette | B64C 39/001 244/6 |
| 6,193,194 B1 * | | 2/2001 | Minovitch | B64G 1/405 244/1 R |
| 6,211,589 B1 * | | 4/2001 | Ahlstrom | F16C 32/0438 310/74 |
| 6,386,484 B1 * | | 5/2002 | Hoyt | B64G 1/648 244/158.2 |
| 6,404,089 B1 * | | 6/2002 | Tomion | B64C 39/001 244/23 A |
| 6,450,445 B1 * | | 9/2002 | Moller | B64C 29/02 244/12.1 |
| 6,575,401 B1 * | | 6/2003 | Carver | B64C 27/20 244/12.2 |
| 6,604,706 B1 * | | 8/2003 | Bostan | B64C 17/06 244/17.11 |
| 6,672,539 B1 * | | 1/2004 | Schoeneck | B64C 27/20 244/12.2 |
| 6,834,829 B2 * | | 12/2004 | Dunagin, Jr. | B64C 27/20 244/12.2 |
| 7,032,861 B2 * | | 4/2006 | Sanders, Jr. | B64C 27/12 244/12.1 |
| 7,556,218 B2 * | | 7/2009 | Schlunke | B64C 39/064 244/12.2 |
| 7,735,774 B2 * | | 6/2010 | Lugg | B64C 29/0066 244/12.1 |
| 8,033,498 B2 * | | 10/2011 | Blackburn | B64C 27/82 244/17.23 |
| 8,181,902 B2 * | | 5/2012 | Schlunke | B64C 39/064 244/12.2 |
| 8,382,029 B2 * | | 2/2013 | Roy | B64C 39/028 244/204.1 |
| 8,413,932 B2 * | | 4/2013 | De Roche | B64C 11/001 244/17.23 |
| 8,464,978 B2 * | | 6/2013 | Yim | B64C 27/20 344/17.23 |
| 8,752,787 B2 * | | 6/2014 | Ruan | B64C 27/20 244/12.2 |
| 8,759,992 B1 * | | 6/2014 | Gottfried | H02K 7/02 290/1 A |
| 8,922,068 B2 * | | 12/2014 | Trammell | H02K 41/031 310/12.18 |
| 9,612,117 B2 * | | 4/2017 | Marshall | B64C 1/283 |
| 9,708,060 B2 * | | 7/2017 | Schwartz | B64C 39/006 |
| 9,803,623 B2 * | | 10/2017 | Burkle | F03D 7/06 |
| 9,950,788 B2 * | | 4/2018 | Garcia | B64C 29/0016 |
| 9,969,493 B2 * | | 5/2018 | Schlunke | A63H 27/12 |
| 10,253,746 B2 * | | 4/2019 | Burkle | F03B 13/142 |
| 2001/0032522 A1 * | | 10/2001 | Davis, Jr. | F03G 3/08 74/84 S |
| 2001/0048877 A1 * | | 12/2001 | Illingworth | B64C 11/001 415/208.2 |
| 2002/0014554 A1 * | | 2/2002 | Kirjavainen | B64C 27/32 244/17.11 |
| 2002/0182078 A1 * | | 12/2002 | Reinfeld | B64C 11/001 416/185 |
| 2003/0130131 A1 * | | 7/2003 | Brotz | B64C 39/001 505/400 |
| 2004/0069901 A1 * | | 4/2004 | Nunnally | B64C 27/20 244/34 R |
| 2004/0094662 A1 * | | 5/2004 | Sanders, Jr. | B64C 27/20 244/12.5 |
| 2005/0056729 A1 * | | 3/2005 | Foster | B64G 1/409 244/171.1 |
| 2005/0109138 A1 * | | 5/2005 | Tavarez | F03G 3/06 74/84 S |
| 2005/0230525 A1 * | | 10/2005 | Paterro | B64C 39/001 244/23 B |
| 2005/0247145 A1 * | | 11/2005 | LeGoff | F03G 7/00 74/84 S |
| 2006/0123937 A1 * | | 6/2006 | Tsepenyuk | F03H 99/00 74/84 S |
| 2007/0062543 A1 * | | 3/2007 | Bastian, II | B64C 27/20 128/844 |
| 2008/0061191 A1 * | | 3/2008 | Gochnour | B64C 39/001 244/171.5 |
| 2009/0183951 A1 * | | 7/2009 | Fiala | B64G 1/285 185/27 |
| 2009/0223323 A1 * | | 9/2009 | Vafaey | B06B 1/162 74/84 S |
| 2010/0006695 A1 * | | 1/2010 | Aguilar | B64C 29/0008 244/12.5 |
| 2011/0079684 A1 * | | 4/2011 | Rudzik | B64G 1/409 244/73 R |
| 2011/0219893 A1 * | | 9/2011 | Fiala | B64G 1/285 74/5.34 |
| 2012/0049009 A1 * | | 3/2012 | Kissel, Jr. | B64C 39/001 244/23 C |
| 2014/0263846 A1 * | | 9/2014 | Crowe | B64G 1/409 244/171.1 |
| 2017/0050752 A1 * | | 2/2017 | Crowe | B64G 1/409 |

\* cited by examiner

CENTRIFUGAL FORCE AMPLIFICATION METHOD AND SYSTEM FOR GENERATING VEHICLE LIFT

CLAIM OF PRIORITY

This application makes reference to, incorporates the same herein, claims all benefits accruing under 35 U.S.C. § 120 from, and is a Continuation-in-Part of, non-provisional application for CENTRIFUGAL FORCE AMPLIFICATION METHOD AND SYSTEM FOR GENERATING VEHICLE LIFT, earlier filed in the United States Patent and Trademark Office on 26 Aug. 2013 and there duly assigned Ser. No. 13/975,420 and published as U.S. 2014/0263846, the disclosure of which is incorporated herein in its entirety by reference. Furthermore, this application also claims benefits accruing under 35 U.S.C. § 119 from provisional application 61/776,916, earlier filed in the United States Patent and Trademark Office on 12 Mar. 2013, the disclosure of which is incorporated herein in its entirety by reference.

BACKGROUND OF THE INVENTION

Field of the Invention

The invention relates generally to vehicles for long-distance air and space travel, and more particularly to a method and system for generating vehicle lift that uses and amplifies a rotating planetary body's centrifugal force for long-distance air and space travel.

Description of the Related Art

Long-distance air and space travel are achieved using vehicles that burn fuel to generate propulsion forces. In the case of long distance air travel, vehicle lift must be supplied continuously. In both air and space travel, the weight of the fuel is a substantial amount of overall vehicle weight. Thus, the combined weight of the vehicle and its fuel must be overcome to lift and propel the vehicle into the air or space. In the case of space vehicles, the percentage of fuel to overall vehicle weight (also known as "mass fraction") typically is in the range of 80-90%. That is, 80-90% of the weight of a space vehicle's "vehicle-plus-fuel combination" is the result of fuel. The requirement for so much combustible fuel presents efficiency, cost, and safety issues.

SUMMARY OF THE INVENTION

Accordingly, it is an object of the present invention to provide a method and system for generating vehicle lift for air and space travel.

Another object of the present invention is to provide an air and space vehicle lift generation method and system that is efficient, cost effective, and inherently safe.

Other objects and advantages of the present invention will become more obvious hereinafter in the specification and drawings.

In accordance with the present invention, a method and system are provided for generating lift for a vehicle relative to a planetary body rotating at a rotational speed. The vehicle incorporates two concentric lift rings in a common plane and having a common center. The lift rings are positioned such that their common plane is approximately perpendicular to a force of gravity on the planetary body. The lift rings are rotated in opposing directions in the rings common plane at speeds that are at least 20 times greater than the rotational speed of the planetary body.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

A centrifugal force amplification vehicle constructed in accordance with the present invention utilizes the motion and forces associated with counter rotating rings to generate lift for the vehicle. When the vehicle is positioned such that the vehicle's motion and forces are combined with the centrifugal force generated by a rotating planetary body (e.g., Earth, Mars, etc.), the vehicle becomes an efficient long-distance air or space vehicle having minimal or no combustible fuel requirements. As will be explained further below, the overall shape and size of the vehicle could approximate or mimic the shape/size defined by the vehicle's counter rotating rings. The vehicle could also incorporate a variety of other known aerodynamic materials and structures/systems (e.g., aerodynamic shaping, control surfaces, thrusters, etc.) without departing from the scope of the present invention. However, in order to clearly illustrate the operating principles of the present invention's centrifugal force amplification method and system for generating vehicle lift, the vehicle's outer mechanical structure is only referenced generally in FIGS. 1-7.

Figure 1:
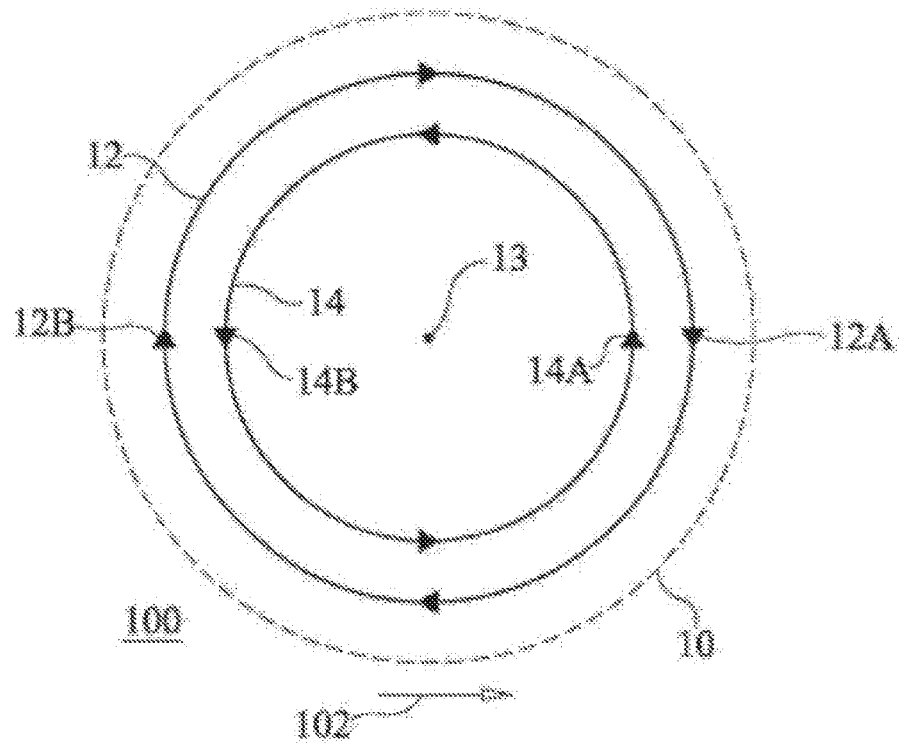
FIG. 1 is a schematic plan view of the motion and force generating elements associated with a centrifugal force amplification method and system for generating vehicle lift in accordance with an embodiment of the present invention.
Figure 2:
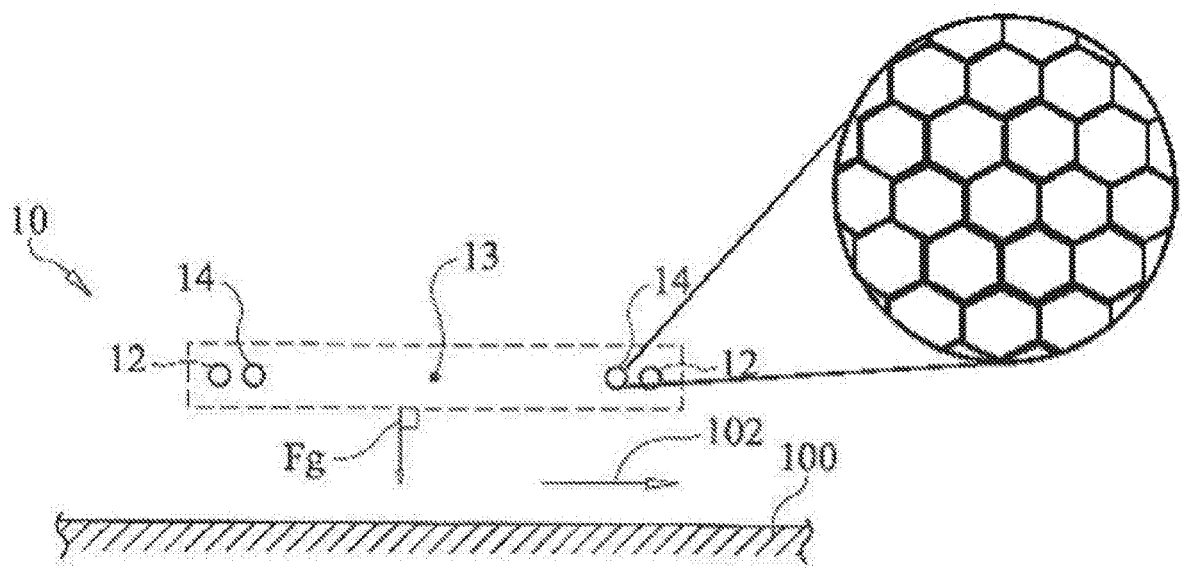
FIG. 2 is a side view of a centrifugal force amplification vehicle of the present invention and a portion of a rotating planetary body.

Referring now to the drawings and more particularly to FIGS. 1 and 2, the motion and force generating elements associated with a centrifugal force amplification vehicle are illustrated, while the vehicle structure is indicated generally by the dashed line circle referenced by numeral 10 in FIG. 1 and by the dashed line rectangle referenced by numeral 10 in FIG. 2, The view presented in FIG. 1 is a plan or top view of vehicle 10 positioned over a rotating planetary body 100 (e.g., Earth, Mars, etc.) rotating at a known speed along a direction of rotation vector referenced by numeral 102. The view presented in FIG. 2 is a side view of vehicle 10 and a portion of rotating planetary body 100. As is well known in the art, when planetary body is Earth, the velocity thereof designated as VEA H is approximately 1000 miles per hour at the Earth's equator and direction of rotation vector 102 points due east.

Vehicle 10 includes two counter rotating rings 12 and 14. A portion of each rotation of rings 12 and 14 is coincident with direction of rotation 102 of planetary body 100. Exemplary construction of rings 12 and 14 will be provided later herein. For purpose of describing the operating principles of the present invention, it is sufficient to say that each of rings 12 and 14 rotates at a speed that is much greater than the rotational speed of planetary body 100. When planetary body 100 is Earth, the rotational speed for each of rings 12 and 14 needs to be on the order of at least 20-30 times the rotational speed of Earth. The relative speed of rings 12/14 (as compared to the rotational speed of planetary body 100) needed to produce vehicle lift is predicated on a number of factors with the most influential of these factors being gravitational forces (or the acceleration force of gravity) on planetary body 100, radius of planetary body 100, rate of rotation of planetary body 100, and latitudinal location of vehicle 10 on planetary body 100, if a planetary body's gravitational force is less than that of Earth or its radius is smaller than that of Earth (e.g., as is the case on Mars), the speed of rings 12/14 may not need to be 20-30 times greater than the rotational speed of planetary body 100.

Rings 12 and 14 lie in the same plane, are concentric such that they have a common center 13, and are radially spaced apart from one another throughout their operation. Ideally, the plane encompassing rings 12/14 is perpendicular (or approximately so) to the planetary body's force of gravity Fg acting thereon as illustrated in FIG. 2. In the illustrated embodiment, ring 12 rotates clockwise while ring 14 rotates counter clockwise as illustrated by the directional arrowheads on the illustration of the rings. However, it is to be understood that ring 12 could rotate counter clockwise and ring 14 could rotate clockwise without departing from the scope of the present invention.

Figure 3:
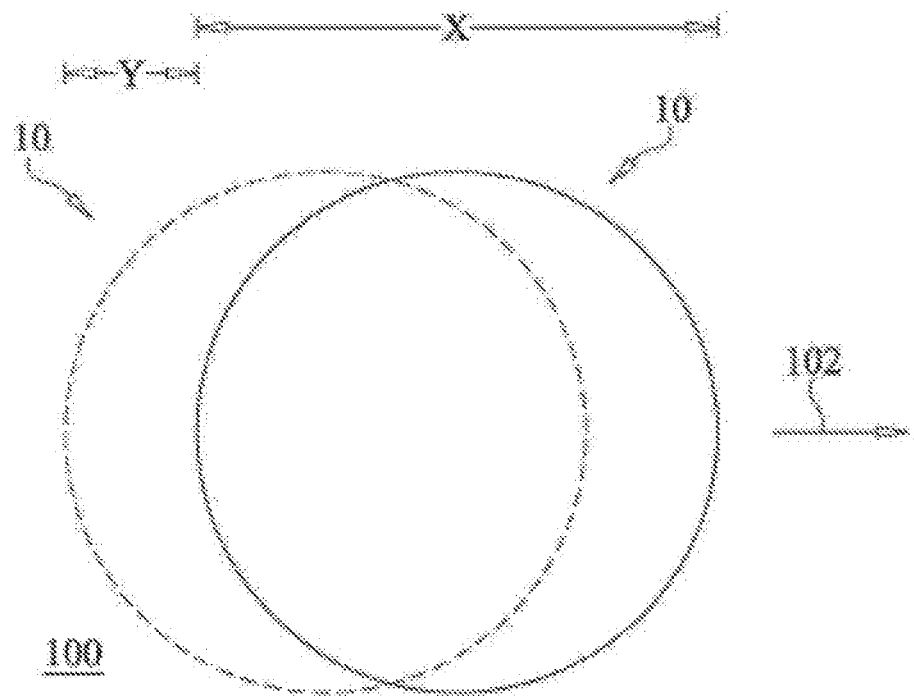
FIG. 3 is a diagrammatic plan view of a centrifugal force amplification vehicle's movement along a planetary body's rotational velocity vector.

As rings 12 and 14 are rotated at the above-described high rate of speed (as compared to that of planetary body 100), each ring 12 and 14 travels a diametric distance coincident with the planetary body's direction of rotation vector 102. This is illustrated in FIG. 3 where the dashed line version of vehicle 10 shows its position at a time $t_0$ and the solid line version of vehicle 10 shows its position at a later time $t_1$. For clarity of illustration, rings 12 and 14 are not illustrated in FIG. 3.

The diameter of vehicle 10 is defined as X and the diametric distance that vehicle 10 travels between times $t_0$ and $t_1$ (due to the rotating speed of planetary body 100) is defined as Y where diametric distance Y is aligned with direction of rotation vector 102. Since rings 12 and 14 (illustrated in FIGS. 1 and 2) are rotating at speeds greater than that of the planetary body's speed of rotation, vehicle 10 amplifies the centrifugal force generated by planetary body 100 thereby generating lift. More specifically, since centrifugal force is a squared function, the aft moving portion of the ring (i.e, where aft is relative to the direction of rotation of the planetary body) always produces less lift than the forward moving portion. That is, the aft moving portion of ring 12 occurs as ring rotates from position 12A to position 12B while the forward moving portion of ring 12 occurs as ring 12 rotates from position 12B to position 12A. A similar situation occurs for ring 14. Taken alone, the lift force generated by each rotating ring 12 and 14 also produces a torque about common center 13 resulting in a yaw force acting on the vehicle. However, the counter rotation of rings 12 and 14 neutralizes the two torque forces. Thus, the resulting sum of the lifts created by the forward and aft motion of the counter rotating rings combined with the rotation of planetary body 100 results in a stabilized center of lift (i.e., minimal or no torque generated about common center 13) being forward of common center 13 of counter rotating rings 12 and 14.

Figure 4A:
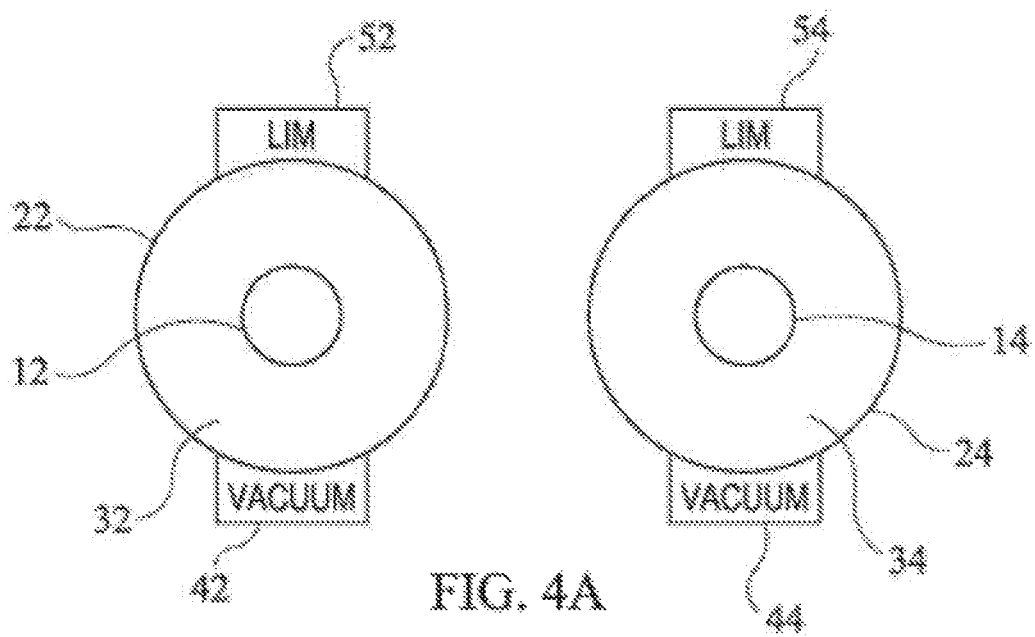
FIG. 4A is a schematic sectional view of a centrifugal force amplification vehicle's counter-rotating ring structure in accordance with an embodiment of the present invention.
Figure 4B:
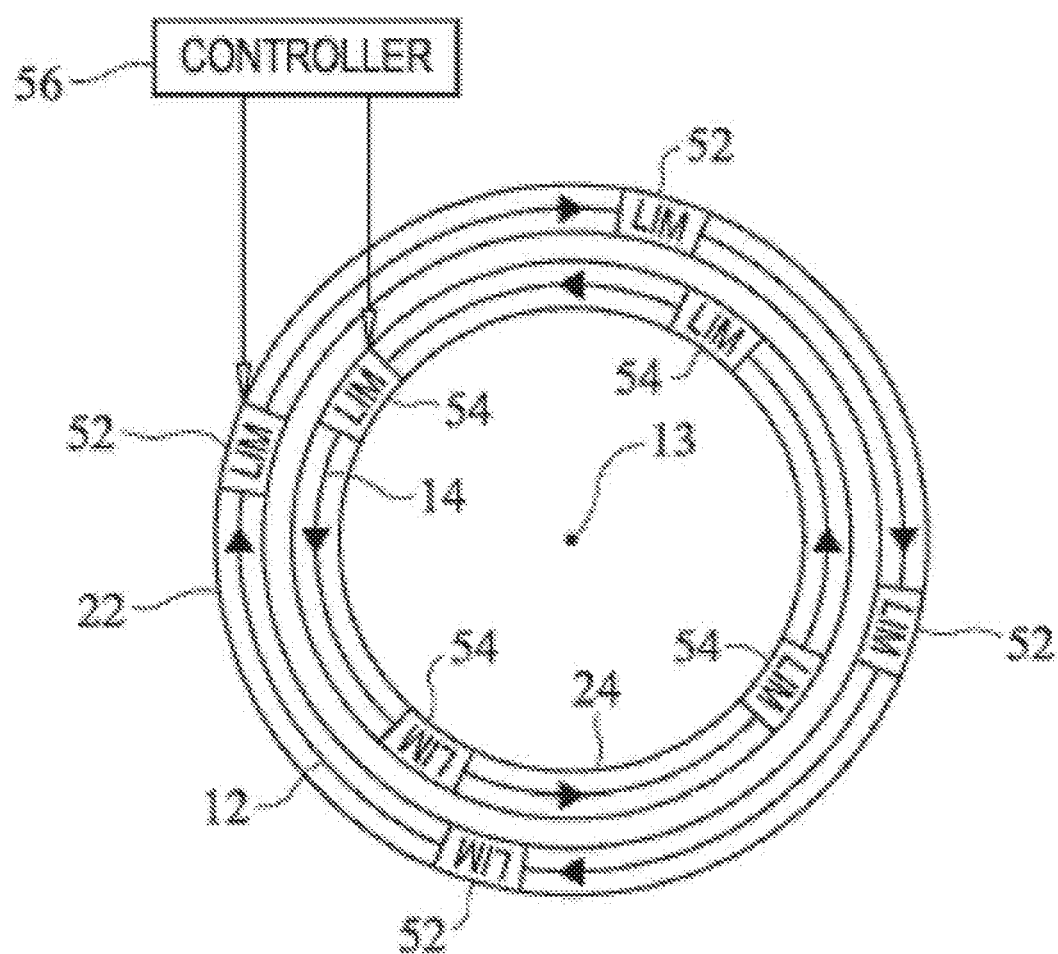
FIG. 4B is a schematic plan view of a centrifugal force amplification vehicle's counter-rotating ring structure in accordance with an embodiment of the present invention.

An exemplary construction for the counter rotating rings for incorporation in a centrifugal force amplification vehicle will now be explained with the aid of FIGS. 4A and 4B. Each of rings 12 and 14 is cylindrical (i.e., circular in cross section) and is made from a material that at least includes magnetic material or is completely made from a magnetic material. This will allow for magnetic levitation within the vacuum tunnel. Rings 12 and 14 can also incorporate high tensile strength materials so that rings 12 and 14 retain their shape as they are rotated. Each of rings 12 and 14 is housed in its own cylindrical tunnel 22 and 24. Each of tunnels 22 and 24 is constructed and maintained to define and/or create an evacuated space 32 and 34 about rings 12 and 14, respectively. Vacuum pumps 42 and 44 (visible only in FIG. 4A) could be coupled to tunnels 22 and 24, respectively, to maintain the needed vacuum. Tunnels 22 and 24 are separated from one another for reasons that will be explained further below. Tunnels 22 and 24 are made completely or at least partially from a superconducting material such that the magnetic-material-based rings 12 and 14 are pushed or suspended within evacuated spaces 32 and 34, respectively, owing to what is well known in the art as the Meissner effect.

Regarding the theory behind why the counter-rotating rings of this invention produce lift by amplifying centrifugal force, the Eötvös Effect is a good starting point. Briefly, the Eötvös Effect is a phenomenon in which two objects at a same location, one at rest and the other moving relative to the Earth, experience different values of downward force stemming from the acceleration of gravity. The Eötvös Effect is caused by a change in the centrifugal component of the force of gravity. This centrifugal component is dependent on the velocity of an object. When an object is moving in the direction of the Earth's rotation (i.e., from west to east), its velocity is added to the velocity of the rotation, and the centrifugal force increases. In this instance, there is a reduction in net gravitational force. Conversely, when an object is moving in a direction that is opposite to Earth's rotation (i.e., from east to west), the net gravitational force (force of gravity minus centrifugal force) acting on the object increases. For example, at the Earth's Equator, Eötvös Effect calculations show that a stationary object moving at the 1000 mph Equator speed reduces the object's weight by 0.34%, or ⅓₀₀th. For purpose of illustration, it will be assumed that the "object" (i.e., the vehicle lift system) is located at the Equator.

Consider the "object" at the Equator includes two large counter-rotating rings. Each point on each ring travels 2 ring diameters in the east/west direction (or direction of Earth's rotation) with each rotation, i.e., one ring diameter for each half rotation in the aft (in the westbound) direction and one ring diameter for each half rotation in the forward (or eastbound) direction. The centrifugal force formula ($mv^2/r$) shows that the forward moving point loses weight faster than the aft moving weight gains. This fore and aft travel causes net weight changes just as Eötvös discovered. These weight changes become significant and provide the source of lift when the rings are rotated at high speed. Substantial gains in lift are achieved when the rings are large diameter rings spinning at high speeds or rpms.

A most basic explanation of my invention is to assume that the velocity of the Earth at the equator due to rotation of the Earth is 4 units. Therefore, the centrifugal force experienced by a stationary ring at the equator is proportional to $mv^2/r$ where v=4 units, or is proportional to 16 m/r. However, if the ring is rotated such that the ring moves at a speed of 1 unit, then a portion of the ring traveling eastbound has a net velocity of 5 units, and the portion of the ring traveling westbound against the direction of Earth rotation has a velocity of 3 units, Noting that the centrifugal force is proportional to the velocity squared, the centrifugal force experienced by a portion of the spinning ring travelling eastbound is proportional to 25 m/r, and the centrifugal force of a portion of the spinning ring traveling westbound is 9 m/r, resulting in an average centrifugal force of the spinning ring being proportional to (25+9)m/2r which is 17 m/r, which is 1 m/r greater than the centrifugal force experienced by the stationary ring. Therefore, by just merely spinning the ring, the ring will experience more centrifugal force upward than a stationary ring, all due to the fact that the centrifugal force is proportional to the square of the speed.

Figure 4C:
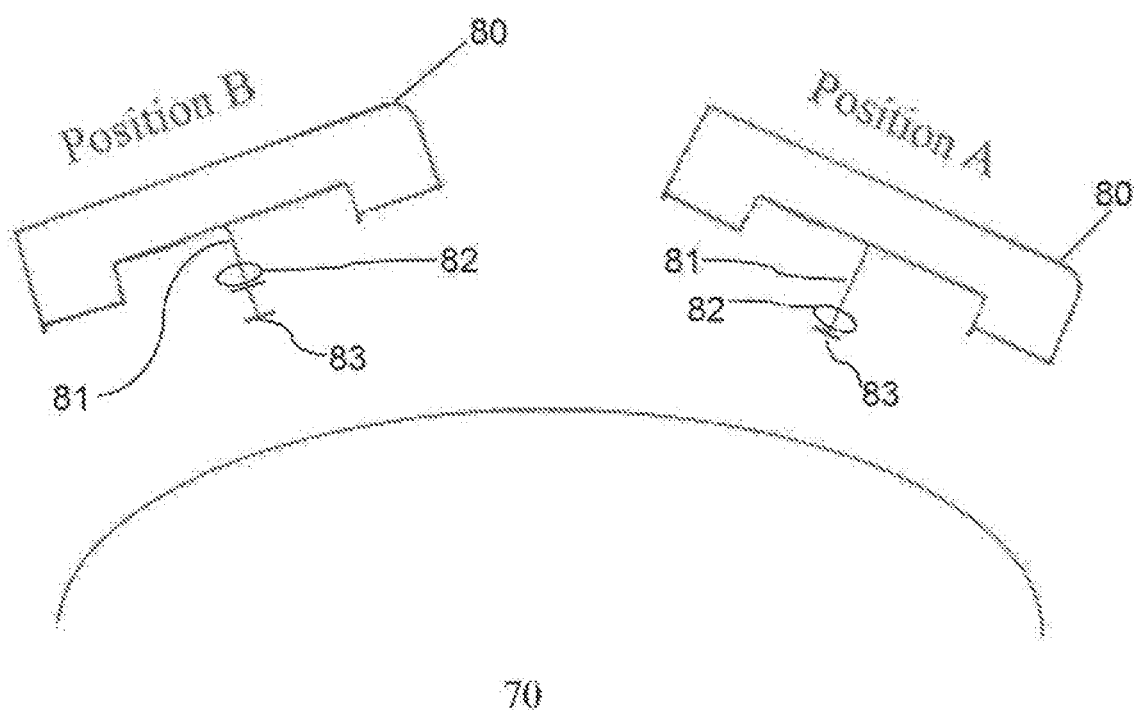
FIG. 4C illustrates an arrangement demonstrating the principles of the present invention of where a spinning ring produces amplification of centrifugal force of the rotating earth and not just torque only.

Turning now to FIG. 4C, FIG. 4C illustrates an arrangement that can be used to demonstrate the concepts of the present invention. As illustrated in FIG. 4C, a satellite 80, such as the international space station, orbits around the Earth 70. On the satellite or international space station 80 is a pole or a shaft pointed towards the center of Earth 70. About said shaft 81 is a ring 82. A stopper 83 is arranged at the bottom of shaft 81 to prevent the ring 82 from falling off of shaft 81 when the ring 82 is not rotating. As illustrated at position A, ring 82 is stationary and rests on stopper 83. When the space station 80 reaches position B, the ring 82 is rotated, and the centrifugal force of the Earth's rotation is amplified by said rotation of ring 82, causing ring. 82 to walk up shaft 81 away from Earth 70 and towards space station 80. The argument that only torque is produced by rotating ring 82 in position B can be seen as being false by assigning a hypothetical value to the speed of the space station 80, then adding the forward velocity of the forward half of the spinning ring 82 and subtracting the aft velocity of the aft half of the spinning ring 82 and comparing that with when the ring 82 is not spinning at all about shaft 81 in position A.

Although the above example is for a single spinning ring, the purpose of including 2 concentrically counter-spinning rings in the design of the present invention is to have one ring cancel out the torque of the other ring, and to provide balance. As a result, the two concentric ring design is designed so that the inner ring 14 has the same torque as the outer ring 12, which may mean that the inner ring 14 is spun slightly faster than the outer ring 12.

As another example, assume that the rings have a radius of 264 feet. The choice of 264 feet means that each rotation has a fore and aft travel of 528 feet or $1/10^{th}$ mile thereby simplifying the calculations. Looking at the centrifugal force equation ($mv^2/r$ where m is the mass of the moving object, v is the velocity of the moving object along a line of travel over a curved surface, and r is the radial distance to the moving body or approximately the radius of Earth), it is noted that each velocity increase results in an exponential increase in lift. Recall that a stationary object at the Equator experiences a weight reduction of 0.34 percent or ⅓₀₀. Accordingly, if an object at the Equator is moving approximately 18 times the 1000 mph speed of the Earth at the Equator, the object is approximately weightless (i.e., approximately 100% weight reduction $(18)^2/300$). Therefore, by further increasing the speed of the rings, the additional "weight reduction" becomes lift.

Regarding how the lift rings are rotated in opposing directions in the rings' common plane at speeds that are 20 times greater than the rotational speed of the planetary body, the rotation of a large/massive magnetic ring in an evacuated tunnel has been known for nearly 40 years and, therefore, is clearly within the skill of the art. Specifically, U.S. Pat. No. 4,077,678 issued to Studer et al. (Studer) in 1978 discloses a flywheel structure for use in energy storage. In particular, Studer teaches the magnetic suspension of a flywheel rotor within an evacuated tunnel. Further, Studer teaches a flywheel rotor structure designed to cope with rotational stresses in order to remain structurally sound as it rotates. See, for example, column 2, lines 62-62; column 3, lines 40-44; column 4, lines 33-54; and column 6, lines 9-19.

Returning now to FIGS. 4A and 4B of the instant invention, to generate rotational motion of rings 12 and 14 in their tunnels, a motive force must be applied to each of rings 12 and 14. One scheme for generating the needed rotation generating force is illustrated in FIGS. 4A and 4B where a number of linear induction motors ("LIM") 52 and 54 are distributed about tunnels 22 and 24, respectively, along what will become the rotational direction of the respective rings. A controller 56 can be coupled to LIMs 52 and 54 for the individual control and energizing thereof. For clarity of illustration, only one such "coupling" is shown in the figures. When the linear induction motors associated with a corresponding one of the rings are periodically energized in a rotational pattern, the magnetic material in that tunnel's ring reacts to the applied induction forces causing the ring to rotate. For pure lift generation in a stable (or torque neutral) fashion, the forces applied by LIMs 52 to ring 12 are the same as the forces applied by LIMs 54 to ring 14. However, as will be explained further below, the forces applied by the LIMs can be adjusted (i.e., to yield an applied force differential between rings 12 and 14) to generate steering forces for the vehicle housing rings 12/14 and their rotation-force generating systems.

The superconducting attributes of tunnels 22 and 24 keep rings 42 and 14 suspended in their evacuated spaces 32 and 34 such that rings 12 and 14 experience virtually no resistance as they are rotated. The minimal-to-no resistance between rings 12/14 and tunnels 22/24 facilitates the rotation of rings 12 and 14 at high rates of speed in addition, tunnels 22/24 supplement the strength of rings 12/14 since the tunnels magnetically center the rings therein.

Figure 5:
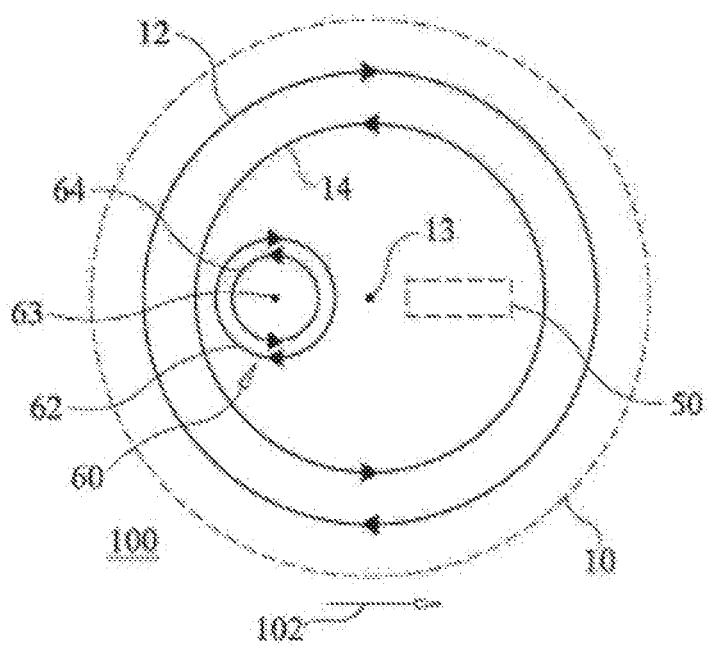
FIG. 5 is a schematic plan view of the motion and force generating elements associated with a centrifugal force amplification vehicle equipped with lift vector adjustment in accordance with another embodiment of the present invention.

As mentioned above, the plane defined by rings 12 and 14 is ideally oriented perpendicular (or approximately so) to the force of gravity Fg (see FIG. 2). For maximum efficiency, this orientation should be maintained as long as the vehicle is subject to the planetary body's force of gravity. However, the counter rotating ring structure described above will generate lift (i.e., a force coming up out of the plane of the paper in FIG. 5) in a region of the vehicle that lies forward of the rings' common center 13 relative to the forward moving portions of the rings that coincide with the direction of rotation vector of the rotating planetary body. This is illustrated in FIG. 5 where the lift forces for vehicle 10 occur in the region designated by dashed line box 50. It is to be understood that the size of region 50 has been exaggerated for purposes of illustrations.

As is evident in FIG. 5, lift region 50 is not at the common center 13 of rings 12 and 14. This is because lift is experienced by vehicle 10 at a position thereon that leads the origination of the lift three by 90°. Since the greatest speed of rings 12/14 occurs where ring rotation is aligned with direction of rotation vector 102, the aft moving ring (in any given rotation of the rings) produces less lift (i.e., centrifugal force) than the forward moving portion that occurs 90° later at the front and back of each ring. The vector sum of these lifts results in the center of lift being forward of common center 13. With increasing speed of the rings, the center of lift approaches alignment with common center 13 although it can never be aligned with common center 13.

Since lift region 50 is not aligned with common center 13, the orientation of the plane defined by rings 12 and 14 with respect to the force of gravity will change and will not remain perpendicular thereto. This will diminish lift (i.e., centrifugal force generation) because it is the fore and aft travel of rings 12 and 14 that creates the centrifugal force.

Figure 6:
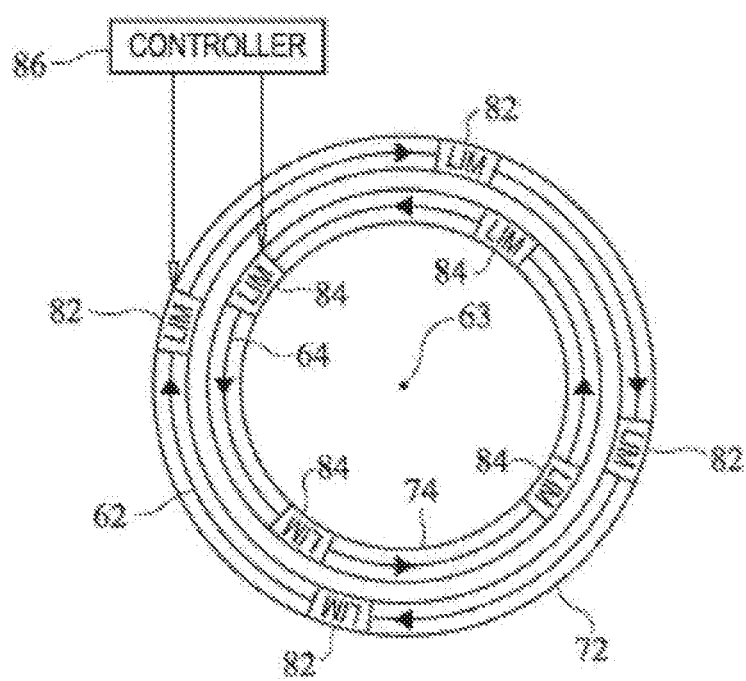
FIG. 6 is a schematic plan view of a centrifugal force amplification vehicle's counter-rotating lift compensating-ring structure in accordance with an embodiment of the present invention.

In order to counteract the off-center location of lift region 50 and maintain the plane of rings 12/14 perpendicular to the planetary body's force of gravity, a vehicle constructed in accordance with the present invention could include a second set of counter rotating rings referenced generally by numeral 60. Ring set 60 includes counter rotating rings 62 and 64 that he in a common plane that coincides with the plane defined by rings 12 and 14. Rings 62 and 64 have a common center 63 and can be constructed/rotated in the same fashion as rings 12 and 14; however, the rings and their rotation-force-generating components e.g., evacuated tunnels 72/74, LIMs 82/84 distributed about tunnels 72/74, and a controller 86 for controlling/energizing rings 62/64 to generate opposing rotation of rings 62/64 as shown in FIG. 6) will be considerably smaller. The counter rotating directions of rings 62/64 can be the same (as shown) or opposite that of rings 12/14 without departing from the scope of the present invention.

In general ring set 60 is positioned such that its common center 63 is offset from common center 13, e.g., aft of common center 13 relative to the forward direction of vehicle 10 or the direction defined by the planetary body's direction of rotation vector 102. In this way, ring set 60 generates a lift adjustment force/vector that compensates for the off-center location of lift region 50. Ring set 60 is operated to generate a compensating lift force that maintains the orientation of the rings' rotational plane perpendicular to the force of gravity as vehicle 10 travels over planetary body 100.

Figure 7:
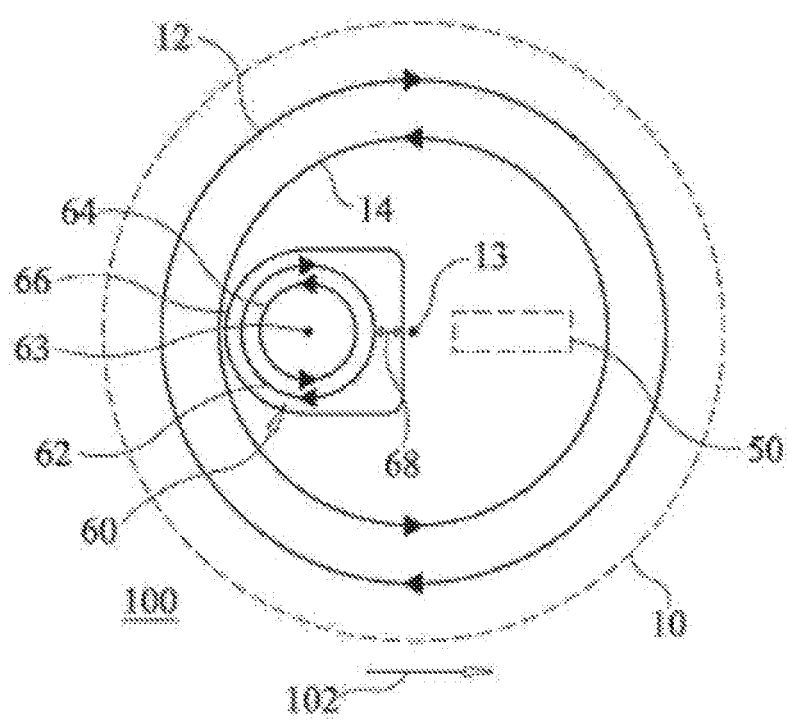
FIG. 7 is a schematic plan view of the motion and force generating elements associated with a centrifugal force amplification vehicle equipped with lift vector adjustment in accordance with yet another embodiment of the present invention.

The compensating lift force/vector generated by ring set 60 can be adjusted during the course of a flight of vehicle 10. Such adjustment can be achieved in a variety of ways without departing from the scope of the present invention. For example, the position of ring set 60 can be fixed relative to rings 12/14 with adjustment of the compensating force/vector being accomplished by varying the rotational speeds of rings 62 and 64. Another option for adjusting the compensating lift force/vector is illustrated in FIG. 7 where vehicle 10 includes a container 66 that houses ring set 60 in a way that allows for fore/aft position adjustment of ring set 60 in the plane of rings 12/14 as indicated by two headed arrow 68. In this version, the rotational speeds of rings 62 and 64 could be fixed while the fore/aft position of ring set 60 is changed to adjust the compensating lift'force/vector. Another option is to equip vehicle 10 with both types of compensating lift force/vector adjustment by providing for movement of set 60 within container 66, while also providing for rotational speed variation of rings 62 and 64.

Steering of a vehicle equipped with the lift generation system of the present invention can be accomplished in a variety of ways without departing from the scope of the present invention. For example, the vehicle could include a variety of control surfaces used to direct air flow in a desired way to implement directional control when the vehicle is flying in an atmosphere. Additionally or alternatively, the vehicle could include strategically placed combustible-fuel thrusters used to impart small amounts of steering propulsion in atmospheric and/or space regions. Still further, the structure of the rings/tunnels described above could be used to steer the vehicle. For example, tunnels 22/24 could be constructed to allow small movement of the tunnels such that a small force could be applied to each ring/tunnel at a position thereon that is 90° before the direction of desired movement thereby supporting changes in speed and direction. Note that this could also require application of a corresponding additional rotation-generating force to the rings to maintain their speed (and ultimately lift) as the ring speed would decrease when energy is taken to change the speed or direction of the vehicle. As mentioned above, the small (steering) force could also be generated by changing the amount of rotation-generating force applied to the rings to create a rotation force differential.

In general, air or space travel's greatest expenditure of energy occurs when a vehicle must first be lifted into the air. In the present invention, the initial lift can be provided from an external, ground-based source since the required mass of the vehicle is greatly reduced. Reduced vehicle mass will make it possible to use a low thrust/high specific impulse power source since there is no need for rapid acceleration or deceleration. The thrust would be applied in the direction desired. This would allow for a vehicle to reach low Earth orbit by having a lower propellant mass fraction, higher specific impulse, a higher thrust to weight ratio than a vehicle that relies entirely on fuel to produce lift. Also, by including the counter-rotating rings of the present invention in a vehicle, the vehicle will no longer be confined to reaching low Earth orbit in a short period of time of 8 or 9 minutes, but can transport a large payload to low Earth orbit in a matter of hours, providing greater flexibility.

In general, the counter rotating ring structure described herein provides stabilized, torque-neutral lift for a vehicle. However, relatively small amounts of torque about the vehicle's common center could still generate yaw forces.

Figure 8:
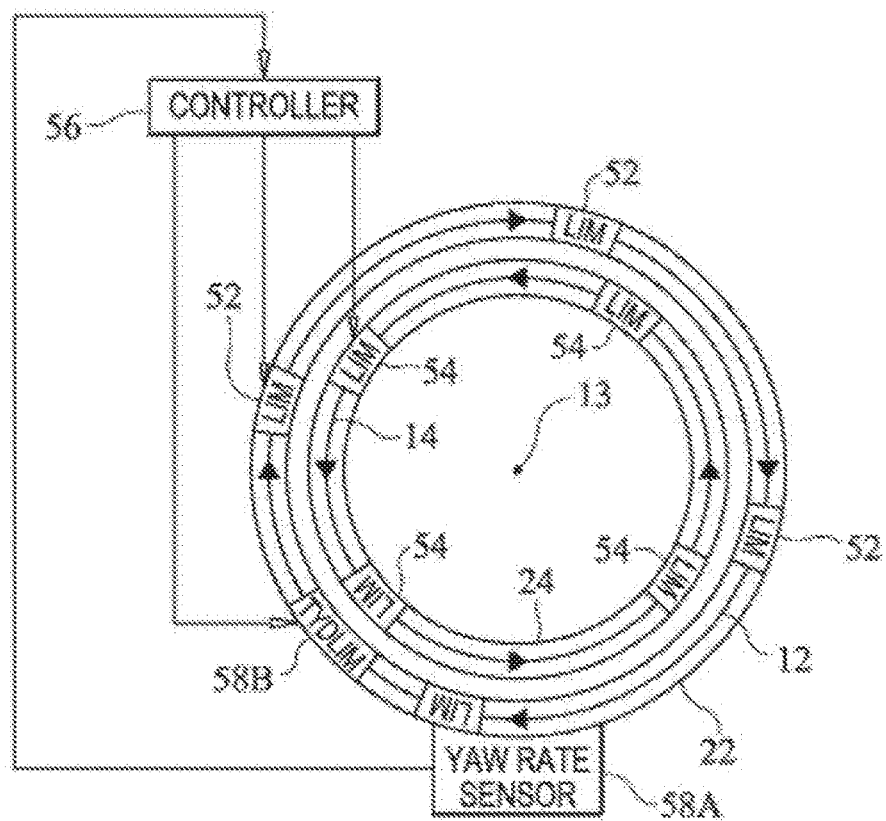
FIG. 8 is a schematic plan view of a centrifugal force amplification vehicle's counter-rotating ring structure to include torque/yaw damping compensation in accordance with another embodiment of the present invention.

Accordingly, the present invention could incorporate torque/yaw damping compensation. For example, FIG. 8 illustrates the counter rotating ring structure from FIG. 4B modified to include torque/yaw damping compensation features. Briefly, a yaw rate sensor 58A (e.g., mounted on tunnel 22) senses changes in yaw and provides same to controller 56. A separate "torque/yaw damping" (TYD) LIM 58B would receive power/control signals from controller 56 based on yaw conditions sensed by sensor 58A. TYD LIM 58B would be operated to make small speed adjustments to ring 12 to reduce/eliminate yaw to thereby keep the vehicle on the desired flight path. In this way, TYD LIM 58B is analogous to an aircraft's rudder although its location relative to the vehicle's direction of travel is unimportant.

Additional control systems could also be employed without departing from the scope of the present invention. For example, a speed comparator system could be used to constantly measure/compare the relative speed of the counter rotating rings and/or monitor power output of the LIMs. Controller 56 could include programming to adjust power to the LIMs to maintain a desired ring speed for stabilized lift.

Figure 9A:
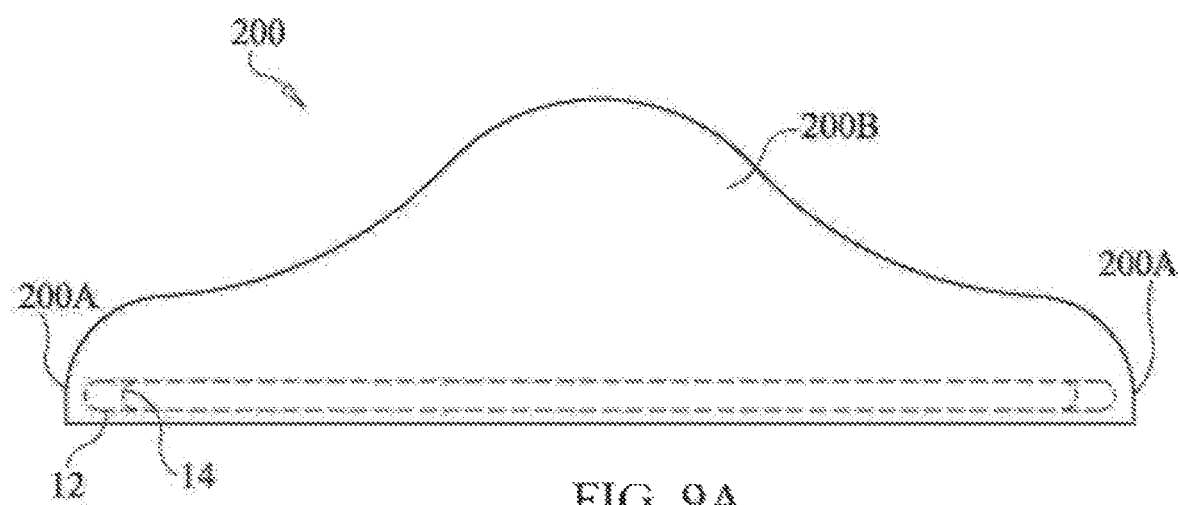
FIG. 9A is a schematic side view of a general vehicle shape for a centrifugal force amplification saucer-shaped vehicle in accordance with an embodiment of the present invention.

A variety of vehicle shapes can incorporate the above-described counter rotating ring design. For example, one type of vehicle shape is illustrated in FIG. 9A and is referenced generally by numeral 200. The general shape of vehicle 200 is that of an inverted saucer with rings 12 and 14 disposed at the circular periphery 200A thereof. In this way, vehicle 200 can employ the largest diameter rings possible to thereby maximize the efficiency of vehicle 200. A cabin or payload region 200B could be positioned above vehicle portion 200A that supports rings 12/14. As mentioned above, vehicle 200 can (and typically will) incorporate other materials, structures and systems to enhance the vehicle's movement through air and space. Ideally, for a saucer configuration, the rings preferably have a diameter of about 150 feet, are arranged in a vacuum tunnel, and magnetically levitate as in a maglev train to allow the rings to be floated, accelerated and decelerated. By having the rings very large in diameter, sufficient lift may be generated by turning the rings at a slower speed than if the rings have a smaller diameter. The particular choices of these material, structures and systems are not limitations of the present invention.

Figure 9B:
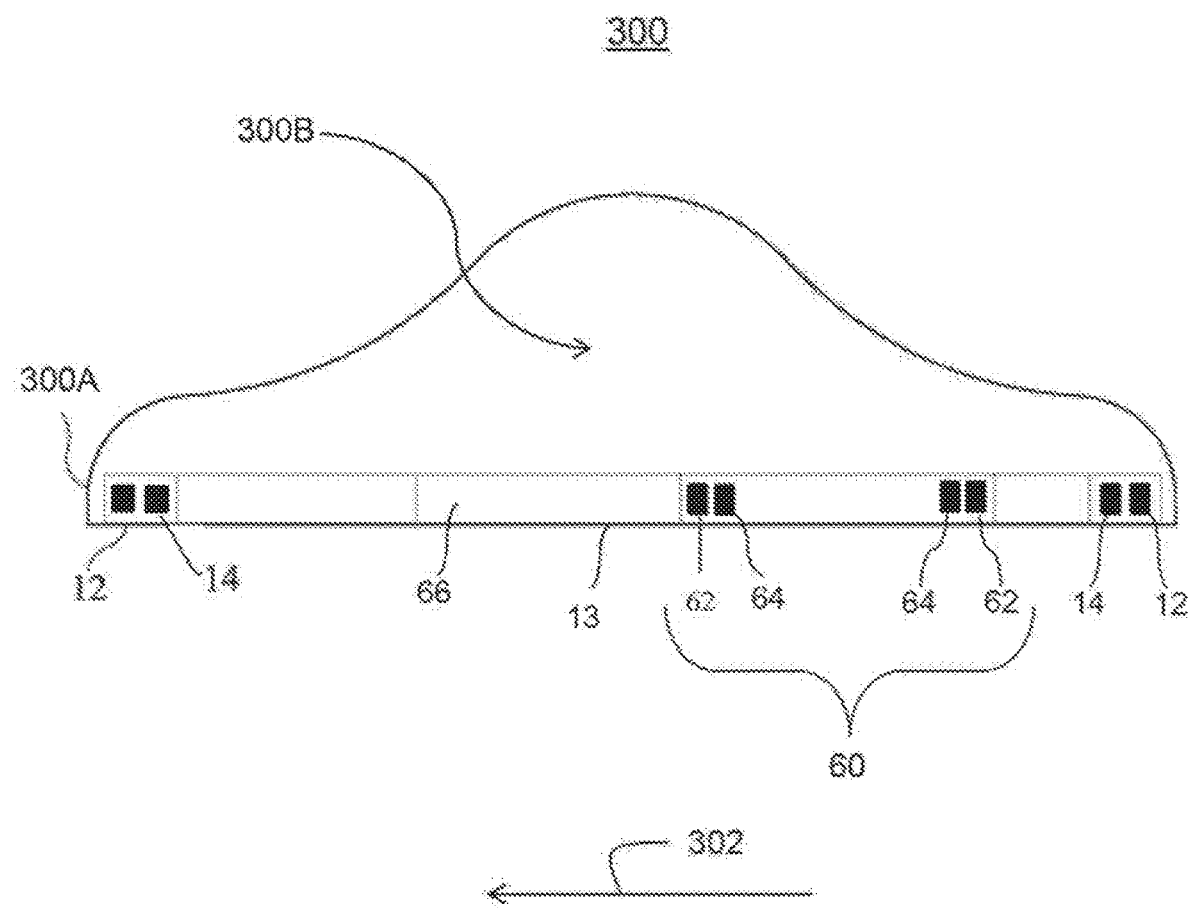
FIGS. 9B and 9C are a cross sectional view and a plan view respectively of another embodiment of a saucer-shaped vehicle in accordance with another embodiment of the present invention.
Figure 9C:
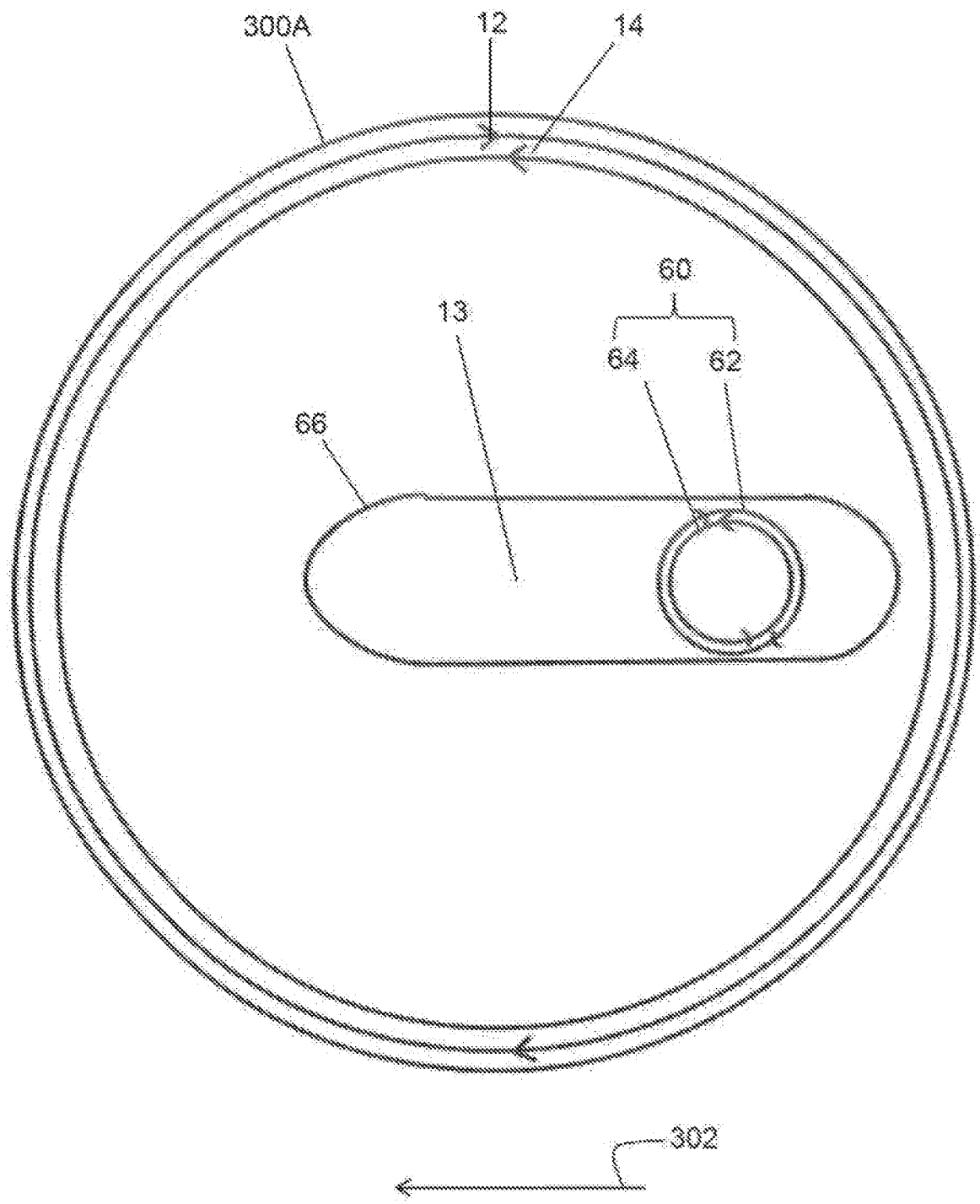

Another embodiment using the saucer shaped configuration is illustrated in FIGS. 9B and 9C. FIG. 9B illustrates a cross-sectional view of saucer 300 including a large set of rings 12/14 and smaller set of rings 60 that includes rings 62 and 64, and FIG. 9C is atop or plan view of the saucer 300 of FIG. 913. Unlike the saucer arrangement 200 of FIG. 9A, the arrangement 300 of FIGS. 9B and 9C includes a ring canister slot 66 that houses a smaller set of rings 60 including rings 62 and 64. As illustrated in FIGS. 9B and 9C, a portion of each of rotating rings 12/14 is coincident with the direction of rotation of the planetary body 302. The large set of rings 12 and 14 are arranged about common center 13, however the second set of rings 60 may be movable with respect to large rings 12/14 and are therefore not necessarily arranged about common center 13. As discussed previously in the above description of FIGS. 5 and 7, the purpose of including the second set of rings 60 is to compensate for when the lift force vector produced by the large set a rings 12/14 is not aligned with the common center of rotation 13, but is instead forward of the common center of rotation. The second set of rings 60 compensates for this so that the lift force for the entire vehicle 300 can be aligned with the common center 13. As discussed above, i) the speed of rotation of rings 62/64 and/or ii) the location of the rotation rings 62/64 with respect to rings 12/14 and common center 13 can be varied during flight of saucer 300 to adjust the compensating lift force/vector of rings 12/14.

To supplement the lift of a wing using the counter-rotating rings described herein, while many aircraft configurations are possible, the best is the canard configuration. As illustrated in the canard arrangement 400 of FIG. 10, the canard configuration has two sets of lifting surfaces, where in a conventional aircraft configuration, the wing lifts and the horizontal stabilizer pulls down. Since the counter-rotating rings of the present invention only lifts, this makes them ideal as a supplement on a canard aircraft.

Figure 10:
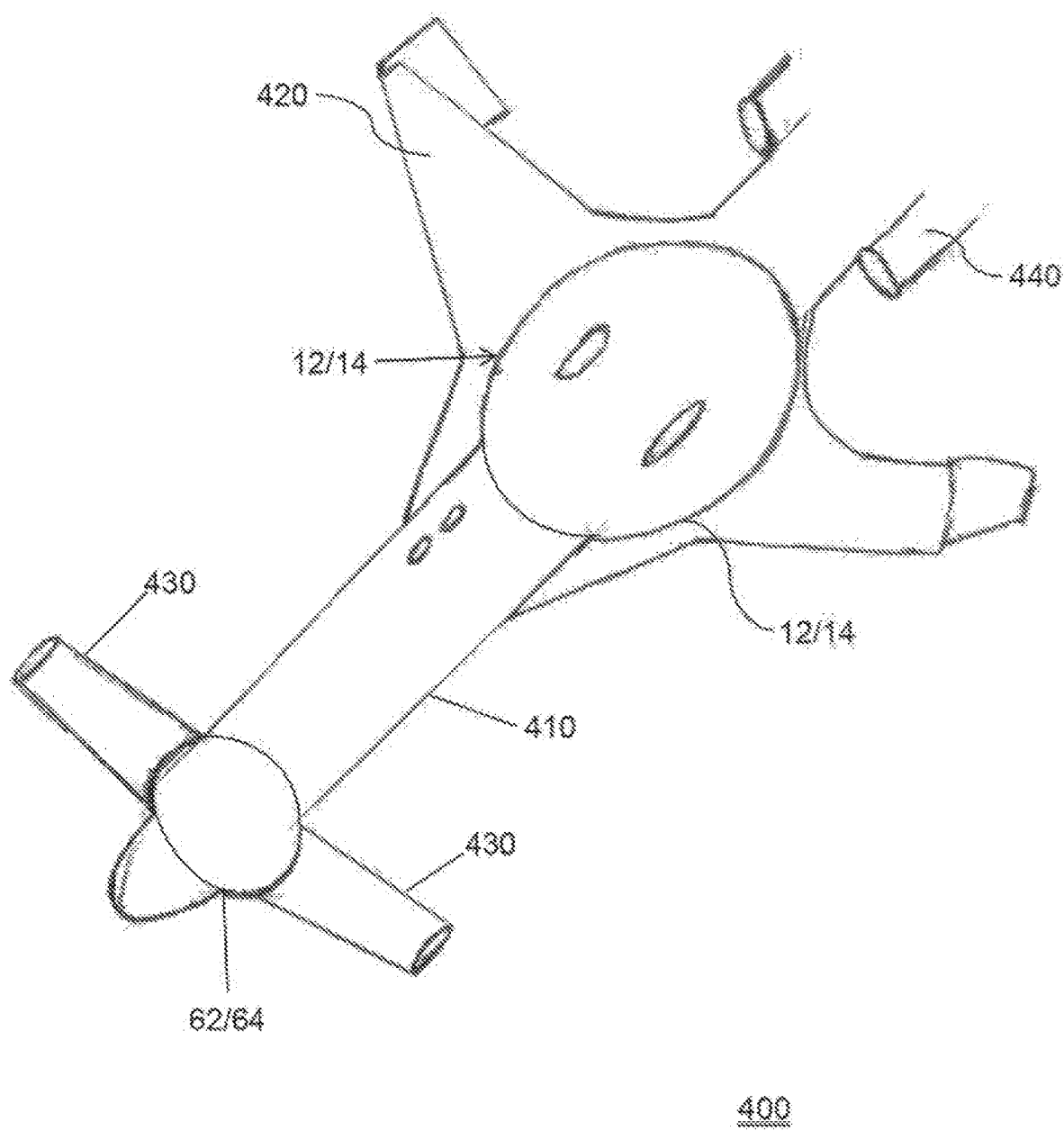
FIG. 10 is a schematic top view of the centrifugal force amplification lift system being incorporated within a canard configuration aircraft in accordance with yet another embodiment of the present invention.

As illustrated by the canard arrangement of FIG. 10, the canard aircraft 400 includes a fuselage 410 extending the length of the aircraft with an engine 440 near the aft, a main wing set 420 in front of engine 440, and a canard wing (or forewing) 430 to the fore. The canard configuration is defined by including the canard wing (or forewing) 430 to the fore in addition to the main wing 420 aft of canard wing 430. Examples of the canard configuration include the Voyager designed by Burt Rutan, which was the first airplane to fly nonstop around the Earth without refueling, as well as the Beechcraft Starship, the Saab 37 Viggen, the XB-70 Valkyrie, the JAS-37 Gripen, the Dassault Rafale, etc. These aircraft are described in detail in U.S. Pat. No. 5,992,796 to Smith which is herein incorporated by reference.

The arrangement of FIG. 10 using the canard configuration is analogous to the arrangements of FIGS. 9B and 9C of the saucer arrangement, except that the smaller ring set 60 in the canard configuration 400 of FIG. 10 is moved forward of the larger ring set 12/14. As illustrated in FIG. 10., the larger set of rings 12/14 are arranged so that a center thereof corresponds to a portion of the fuselage where the main wings 420 are attached, and the front ring set 60 including rings 62 and 64 are arranged at a location corresponding to where the fuselage is attached to the canard wings 430. An important design consideration for implementing the counter-rotating rings in a winged aircraft such as the canard is that the larger set of rings 12/14 should have as large a diameter as possible, preferably 22 feet in diameter or more. As a result, it is preferable to choose aircraft where a tunnel compartment for rings 12/14 can have a diameter of 22 feet or more. The material for the rings may preferably include carbon nanotubes, however this can change with advances in material science. The material for the rings may also be magnetic to allow for magnetic levitation when arranged within a vacuum tunnel, analogous to a Maglev train to allow the rings to float, accelerate and decelerate. Also a composite material may be used for the rings, the material may include both a magnetic material and a high tensile strength material. What is important in the choice of materials for the rings is that it must be of a high tensile strength so that the ring will not stretch or break upon being, spun at a high rate of angular speed.

In the canard arrangement 400 of FIG. 10, there is a natural synergistic relationship between the wings and the rings. The wings make possible the lift and forward speed at lower altitudes to allow the rings to be more efficient at higher speeds over the curve of the Earth, making centrifugal force amplification more efficient. In addition, as the wings lose lifting force at higher altitudes of 40,000 to 50,000 feet, the rings do not. As speed over the curve of the Earth increases, the lift of the rings increases as a function of the square of the speed, making them an ideal supplement to the wing or wings and allow climbing above the atmosphere where flight with "ring only" lift can occur. This will allow the aircraft to travel at higher speeds and be more fuel efficient than aircraft that rely only on wings for lift.

Figure 11:
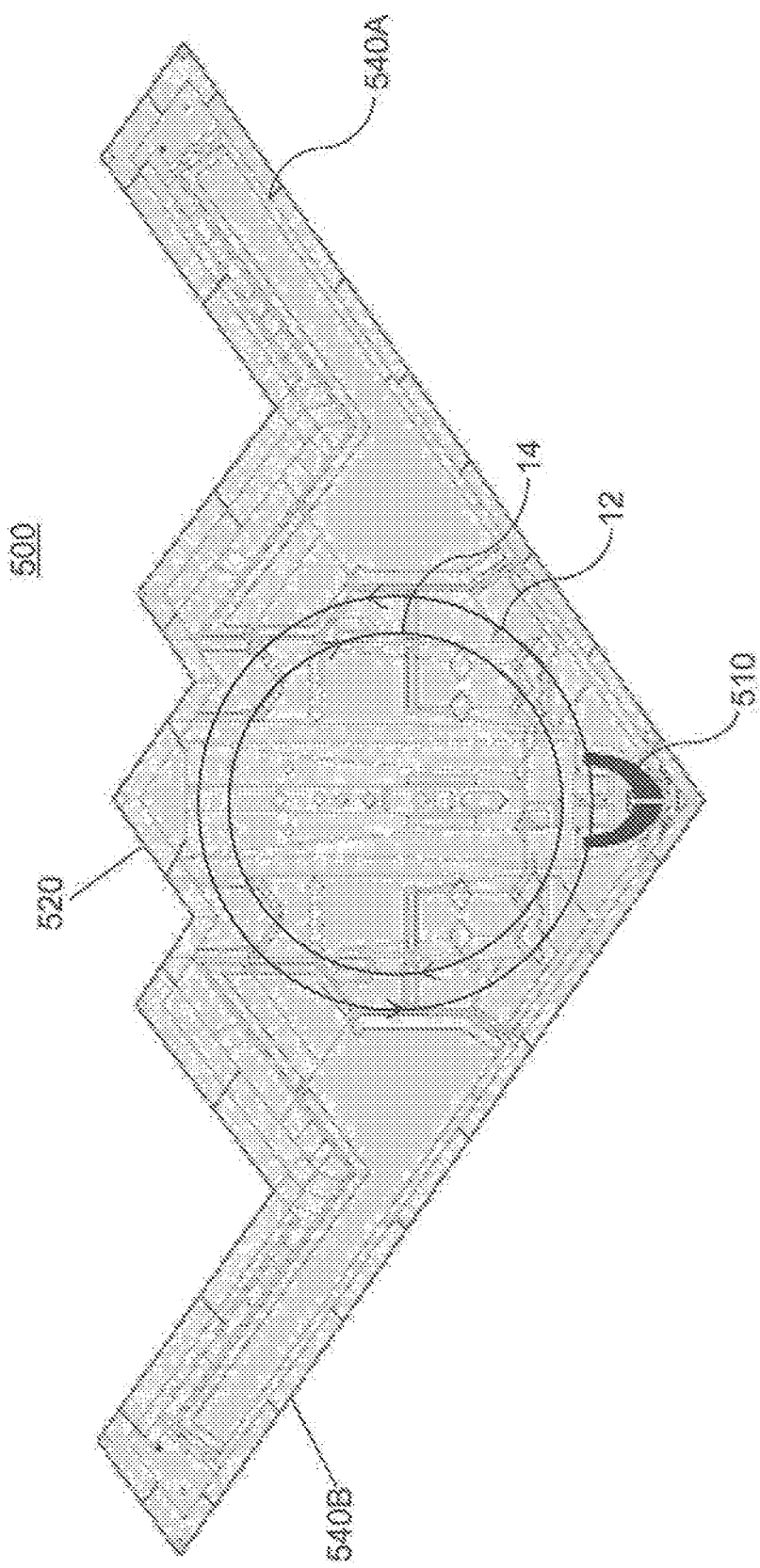
FIG. 11 is a schematic top view of the centrifugal force amplification lift system being incorporated within a flying wing aircraft in accordance with still another embodiment of the present invention.

According to yet another embodiment, the centrifugal force amplification lift system can be installed within wings of a flying wing aircraft 500 as illustrated in FIG. 11. A flying wing is a tailless fixed-wing aircraft that has no definite fuselage. The crew, payload, fuel, and equipment can be arranged inside the main wing structure. An example of a flying wing aircraft is the B-2 Spirit by Northrop Grumman. As with the canard configuration 400 of FIG. 10, the centrifugal force amplification lift system in the flying wing structure 500 of FIG. 11 can supplement the lift of the wings and allow the aircraft to fly at a higher altitude, and perhaps reach orbit, such as Low Earth orbit.

Flying wing 500 includes a flight deck 510 at the fore, a jagged boundary 520 to the aft, a port wing 540A and a starboard wing 540B. In this exemplary embodiment, a large set of counter rotating rings 12 and 14 are arranged over a central portion of the flying wing 500 between the flight deck 510 and the aft edge 520. Although not illustrated, a smaller set of rings 60 can also be included in the flying wing 500 of FIG. 11 to compensate for changes an aberrations in the lift vector of rings 12/14.

It is also feasible to install the counter-rotating rings of the present invention in a large commercial aircraft to thereby supplement, and at higher altitudes, replace wing lift. Also, other suitable aircraft that may be able to use the counter-rotating rings according to the principles of the present invention to supplement lift can be found in Lockheed Martin's Skunk Works facility let by the late Ben Rich.

The advantages of the present invention are numerous. Scale model testing of the present invention has shown that the counter rotating ring method and system amplify a planetary body's centrifugal force acting on a vehicle to provide vehicle lift. Since most of the energy needed to rotate the rings occurs at start-up, a vehicle constructed in accordance with the present invention could be initially powered using a source that is external to the vehicle and can be separated from the vehicle once the rings reach a critical speed. Such an external power source could be stationed and remain on the ground where it can serve as the initial power source for multiple vehicles. Once airborne, the above-described ring/tunnel structure will require relatively little energy to keep the rings rotating at the speeds necessary for in-air or space flight.

Although the invention has been described relative to a specific embodiment thereof, there are numerous variations and modifications that will be readily apparent to those skilled in the art in light of the above teachings. It is therefore to be understood that the invention may be practiced other than as specifically described. Although the present specification has included many examples of how the counter-rotating rings of the present invention can be implemented, in no way is the present invention so limited.

By amplifying centrifugal force of the Earth's rotation by including counter-rotating rings in a vehicle, lift can be produced without having to include an enormous amount of fuel on board the vehicle. This would allow for a vehicle to reach low Earth orbit by having a lower propellant mass fraction, higher specific impulse, a higher thrust to weight ratio than a vehicle that relies entirely on fuel to produce lift. Also, by including the counter-rotating rings of the present invention in a vehicle, the vehicle will no longer be confined to reaching low Earth orbit in a short period of time of 8 or 9 minutes, but can take even hours to reach low Earth orbit, providing greater flexibility.

What is claimed as new and desired to be secured by Letters Patent of the United States is:

1. A centrifugal force amplification vehicle lift system, comprising:
   a first arrangement of two concentric and radially separated magnetic rings in a common plane and having a common center, said magnetic rings are positioned with said common plane substantially perpendicular to a force of gravity associated with a planetary body rotating at a rotational speed;
   a first force generator coupled to said magnetic rings in said first arrangement for rotating said magnetic rings in said first arrangement in opposing directions in said common plane at speeds that are at least 20 times greater than the rotational speed of the planetary body, said first force generator including:
   two concentric evacuated first tunnels, each of said evacuated first tunnels comprised of a superconducting material and encasing one of said magnetic rings,
   wherein each of said magnetic rings is suspended within one of said evacuated first tunnels,
   a first plurality of linear induction motors distributed about each of said evacuated first tunnels, and
   a first controller coupled to said first plurality of linear induction motors for energizing said first plurality of linear induction motors, wherein said magnetic rings in said first arrangement are forced to rotate in said opposing directions;
   a second arrangement of two concentric and radially separated compensating magnetic rings that are smaller in diameter than each of said magnetic rings in said first arrangement, said compensating magnetic rings lying in a plane coincident with said common plane of said magnetic rings in said first arrangement, said compensating magnetic rings having a common center, said compensating magnetic rings are positioned with said common center is offset from said common center of said magnetic rings in said first arrangement; and
   a second force generator coupled to said compensating magnetic rings for rotating said compensating magnetic rings in said common plane thereof and in opposing directions at speeds that are at least 20 times greater than the rotational speed of the planetary body, said second force generator including:
   two concentric evacuated second tunnels, each of said evacuated second tunnels comprised of a superconducting material and encasing one of said compensating magnetic rings wherein each of said compensating magnetic rings is suspended within one of said evacuated second tunnels associated therewith,
   a second plurality of linear induction motors distributed about each of said evacuated second tunnels, and
   a second controller coupled to said second plurality of linear induction motors to energize said second plurality of linear induction motors, wherein said compensating magnetic rings are forced to rotate in said opposing directions.

2. The centrifugal force amplification vehicle lift system of claim 1,
   wherein said second force generator changes the speeds of said compensating magnetic rings in said second arrangement as said first force generator rotates said magnetic rings in said first arrangement.

3. The centrifugal force amplification vehicle lift system of claim 1, wherein a location of said common center of said compensating magnetic rings in said second arrangement relative to said common center of said magnetic rings in said first arrangement is changed as said first force generator rotates said magnetic rings in said first arrangement and said second force generator rotates said compensating magnetic rings in said second arrangement.

4. The centrifugal force amplification vehicle lift system of claim 3, wherein said second force generator changes the speeds of said compensating magnetic rings in said second arrangement as said first force generator rotates said magnetic rings in said first arrangement, and wherein a location of said common center of said compensating magnetic rings in said second arrangement relative to said common center of said magnetic rings in said first arrangement is changed as said first force generator rotates said magnetic rings in said first arrangement and said second force generator rotates said compensating magnetic rings in said second arrangement.

5. A canard aircraft, comprising:
 a fuselage;
 an engine mounted to the rear of the fuselage;
 a main wing set mounted on the fuselage forward of the engine;
 a canard wing set mounted at a front of the fuselage and in front of the main wing set; and
 the centrifugal force amplification vehicle lift system of claim 1 is arranged at a location corresponding to a portion of the fuselage that intersects the main wing set.

6. The canard aircraft of claim 5, wherein the canard aircraft has a canard shape.

7. The canard aircraft of claim 5, wherein the concentric rings of the first arrangement each have a diameter of at least 22 feet.

8. A flying wing aircraft, comprising the centrifugal force amplification vehicle lift system of claim 1 arranged at a central portion.

9. The flying wing aircraft of claim 8, wherein the flying wing aircraft has a canard shape.

10. The flying wing aircraft of claim 8, wherein the concentric rings of the first arrangement each have a diameter of at least 22 feet.

11. The flying wing aircraft of claim 8, the rings comprised of a composite of multi-walled carbon nanotubes and a magnetic material.

12. The centrifugal force amplification vehicle lift system of claim 1, wherein the rotational speed of the planetary body is 1000 mph and corresponds to the Earth's equator.

13. The centrifugal force amplification vehicle lift system of claim 1, wherein the rotational speed of the planetary body is 500 mph and corresponds to the Mars' equator.

14. The centrifugal force amplification vehicle lift system of claim 1, wherein the rotational speed of the planetary body is 100 mph.

* * * * *